(12) United States Patent
Krupansky et al.

(10) Patent No.: US 9,377,324 B2
(45) Date of Patent: Jun. 28, 2016

(54) COMPUTER ASSISTED HUMAN MACHINE INTERFACE DISPLAY

(75) Inventors: Petr Krupansky, Veverska Bityska (CZ); Jiri Vasek, Brno (CZ); Larry Karl Ball, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1133 days.

(21) Appl. No.: 12/891,549

(22) Filed: Sep. 27, 2010

(65) Prior Publication Data

US 2012/0078445 A1    Mar. 29, 2012

(51) Int. Cl.
*G01C 21/00* (2006.01)
*G01C 23/00* (2006.01)

(52) U.S. Cl.
CPC ..................................... *G01C 23/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,208,590 A * | 5/1993 | Pitts | ........................ | G01C 23/00 340/973 |
| 5,519,392 A | 5/1996 | Oder et al. | | |
| 5,797,562 A | 8/1998 | Wyatt | | |
| 6,002,347 A | 12/1999 | Daly et al. | | |
| 6,112,141 A * | 8/2000 | Briffe | ...................... | G01C 23/00 345/1.3 |
| 6,163,743 A * | 12/2000 | Bomans | .................. | G01C 23/00 244/180 |
| 6,346,892 B1 | 2/2002 | DeMers et al. | | |
| 6,466,235 B1 | 10/2002 | Smith et al. | | |
| 6,542,796 B1 * | 4/2003 | Gibbs | .................. | G01C 23/005 244/183 |
| 6,633,810 B1 * | 10/2003 | Qureshi | ................. | B64D 43/00 244/75.1 |
| 6,707,475 B1 * | 3/2004 | Snyder | ................... | B64D 43/00 345/902 |
| 6,809,724 B1 * | 10/2004 | Shiraishi | ................. | G06F 1/163 345/157 |
| 7,091,881 B2 | 8/2006 | Judge et al. | | |
| 7,215,256 B2 | 5/2007 | Reusser et al. | | |
| 7,295,135 B2 | 11/2007 | Younkin | | |
| 7,307,549 B2 | 12/2007 | Firra | | |
| 7,437,221 B2 | 10/2008 | Hardman et al. | | |
| 7,538,781 B2 * | 5/2009 | Gyde | ..................... | B64D 43/00 345/1.3 |
| 7,612,688 B1 | 11/2009 | Vigeant-Langlois et al. | | |
| 7,626,515 B1 | 12/2009 | Langner et al. | | |
| 7,667,621 B2 * | 2/2010 | Dias | ..................... | G08G 5/0021 340/963 |
| 7,693,621 B1 | 4/2010 | Chamas | | |
| 7,818,100 B2 * | 10/2010 | Goodman | ............. | B64C 25/426 244/111 |
| 9,115,995 B1 * | 8/2015 | Owen | .................... | G01C 23/00 |

(Continued)

FOREIGN PATENT DOCUMENTS

CN    101261565 A1    9/2008

OTHER PUBLICATIONS

Vasek, Jiri et al.; Methods and Systems for Reviewing Datalink Clearances; Filed with the USPTO on Mar. 26, 2009 and assigned U.S. Appl. No. 12/412,163.

(Continued)

*Primary Examiner* — Jonathan L Sample
(74) *Attorney, Agent, or Firm* — Ingrassia Fisher & Lorenz, P.C.

(57) ABSTRACT

Methods and apparatus are provided for selectively balancing pilot workload. The apparatus comprises a display device configured to display a user interface (UI) and a processor. The processor is configured to determine a state of the pilot and/or a state of the aircraft, prepare modification to the UI based in part on the state of the pilot and/or the state of the aircraft such that the modification adds one or more command icons without obscuring, without removing, and without replacing any information item on the display, and to execute the modification.

20 Claims, 8 Drawing Sheets

(56) References Cited

U.S. PATENT DOCUMENTS

| | | | |
|---|---|---|---|
| 2002/0075171 A1 | 6/2002 | Kuntman et al. | |
| 2003/0034901 A1* | 2/2003 | Griffin, III | G01C 23/00 340/945 |
| 2003/0098886 A1* | 5/2003 | Janssen | G06F 3/0481 715/790 |
| 2004/0004557 A1 | 1/2004 | Sikora | |
| 2004/0210847 A1* | 10/2004 | Berson | G01D 7/08 715/788 |
| 2005/0007386 A1* | 1/2005 | Berson | G01C 23/00 345/633 |
| 2005/0231390 A1 | 10/2005 | Crane et al. | |
| 2006/0066638 A1* | 3/2006 | Gyde | G01C 23/00 345/635 |
| 2006/0238511 A1* | 10/2006 | Gyde | G01C 23/00 345/168 |
| 2008/0119969 A1* | 5/2008 | McCullough | G01C 23/005 701/3 |
| 2008/0249675 A1* | 10/2008 | Goodman | B64C 25/426 701/16 |
| 2009/0231164 A1* | 9/2009 | Burgin | G08G 5/02 340/971 |
| 2009/0319100 A1* | 12/2009 | Kale | G08G 5/0013 701/4 |
| 2010/0148991 A1* | 6/2010 | Aspen | G01C 21/00 340/971 |
| 2010/0152928 A1* | 6/2010 | Aymeric | G01C 23/005 701/3 |
| 2010/0174424 A1* | 7/2010 | Cornell | G01C 23/00 701/9 |
| 2010/0321488 A1* | 12/2010 | Soler | G08G 5/025 348/115 |
| 2011/0196881 A1* | 8/2011 | Deleris | G08G 5/0021 707/752 |
| 2011/0199202 A1* | 8/2011 | De Mers | A61B 5/18 340/439 |
| 2011/0313597 A1* | 12/2011 | Wilson | G01C 23/00 701/3 |
| 2012/0078445 A1* | 3/2012 | Krupansky | G01C 23/00 701/3 |

OTHER PUBLICATIONS

CN Office Action for Application No. 201110358661.8 dated Nov. 4, 2015.
CN Search Report for Application No. 201110358661.8 dated Oct. 16, 2015.

* cited by examiner

FIG. 10

COMPUTER ASSISTED HUMAN MACHINE INTERFACE DISPLAY

TECHNICAL FIELD

The present invention generally relates to human machine interfaces, and more particularly relates to the conditional automation of data input tasks using the human machine interface.

BACKGROUND

With an ever more burdensome regulatory environment and increasing aircraft congestion, pilots face a steady increase in workload while flying. This is particularly so during stressful situations during adverse weather conditions, equipment casualties, and other abnormal situations that may occur aboard the aircraft from time to time.

In an attempt to alleviate increasing workload levels, engineers have introduced increasingly complex human machine interfaces (HMI). Such efforts have increased the number of interface devices in the cockpit, have added visual and audible alarms, and have placed more information onto existing user interfaces (UI). However, those UIs are modified in that information is replaced, deleted or and/or the graphical presentation is otherwise materially altered. Particularly in times of stress, altering a UI introduces an additional confusion factor as the pilot is then required to notice the altered presentation, determine the new location of any needed information needed and then verify that he has identified the correct information.

Conversely, pilot boredom is experienced in the cockpit during uneventful cruise segments of the flight plan that may cause pilots to become inattentive or become drowsy. Overly automated systems contribute to the monotony. During such periods, it may be desirable to balance the workload of the pilot improved pilot performance.

Accordingly, it is desirable to be able to optimize the workload of a pilot during both stressful periods and calm periods. In addition, it is desirable to adjust the workload without materially disturbing a pilot's accustomed cockpit display configuration. Furthermore, other desirable features and characteristics of the present invention will become apparent from the subsequent detailed description of the invention and the appended claims, taken in conjunction with the accompanying drawings and this background of the invention.

BRIEF SUMMARY

An interactive apparatus for an aircraft is provided. The apparatus comprises a display device configured to display a user interface (UI) and a processor. The processor is configured to determine a state of the aircraft. The processor is further configured to prepare a modification to the UI based in part on the state of the aircraft such that the modification adds one or more command icons without obscuring, without removing, and without replacing any information item on the display. The processor then executes the modification.

A method is provided for selectively balancing pilot workload. The method comprises acquiring data and determining a state of the aircraft from the data. The method also comprises selecting a predetermined modification to a user interface (UI) based at least in part by the state of the aircraft, preparing a set of computer executable instructions based at least in part on the selected pre-determined modification and the data, and providing the pilot with an option to execute the computer readable instructions by rendering a command icon on the UI. The rendering adds one or more command icons without hiding, without removing, and without replacing any information item within the UI.

A tangible computer readable storage medium is provided containing instructions that when executed acquire data and determine a state of the aircraft from the data. The instructions then acquire data and determine a state of the aircraft from the data. The instructions also select a predetermined modification to a user interface (UI) based at least in part by the state of the aircraft and prepare a set of computer executable instructions based at least in part on the selected pre-determined modification and the data. The instructions then provide the pilot with an option to execute the computer readable instructions by rendering a command icon to the UI, wherein the rendering adds one or more command icons without obscuring, without removing, and without replacing any information item within the UI.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Figure 1:
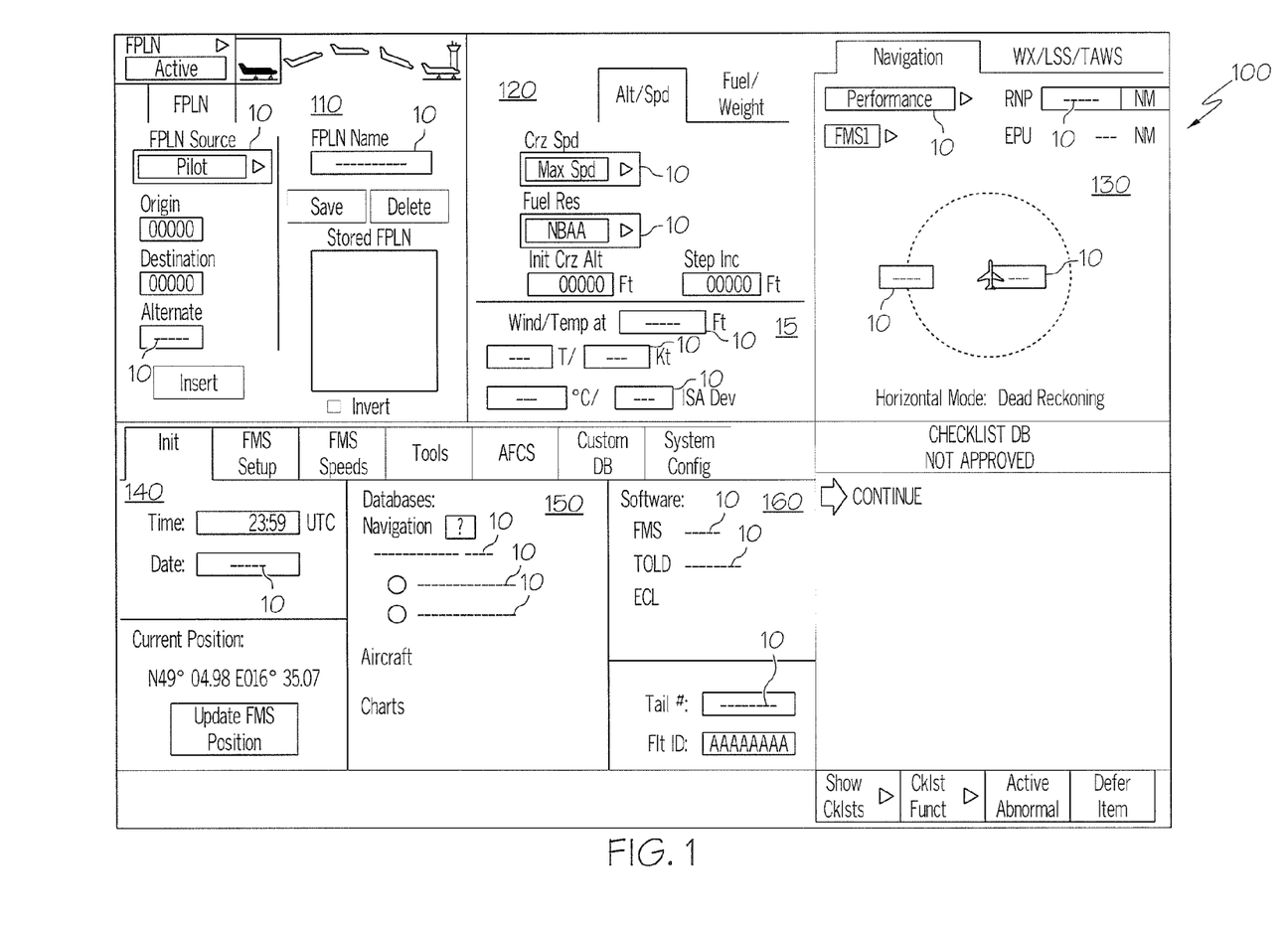
FIG. 1 is an exemplary illustration of a prior art user interface (UI)

FIG. 1 is an illustration of an exemplary UI 100. The exemplary UI 100 that may be used for flight planning and implementing air traffic control (ATC) clearances by a pilot. The dashed lines in various locations indicate a data input dialog box 10 but the data has been omitted in the interest of clarity. Section 110 of the UI exemplary 100 may allow for the selection of a flight plan. Section 120 may allow for the input of a cruise speed and initial cruise altitude, weight, fuel and atmospheric information. Section 130 may be a navigation performance section that may allow for the input of Required Navigation Performance (RNP). Section 140 may allow for initialization such as the input of the date, time and position. Section 150 may allow for the selection of charts and other stored navigation information. Section 160 may allow for the input of aircraft and software information.

During calm periods of a flight, manual data input into the dialog boxes of the UI 100 is not taxing on the pilot. In fact it is a routine task that may focus the pilot in an otherwise monotonous time period. However, during inclement weather, during a casualty or during a busy segment of the flight, the routine tasks involved in using the UI 100 may add to the workload of the pilot or become a distraction in an already stressful situation where several activities are being performed in parallel.

Figure 2:
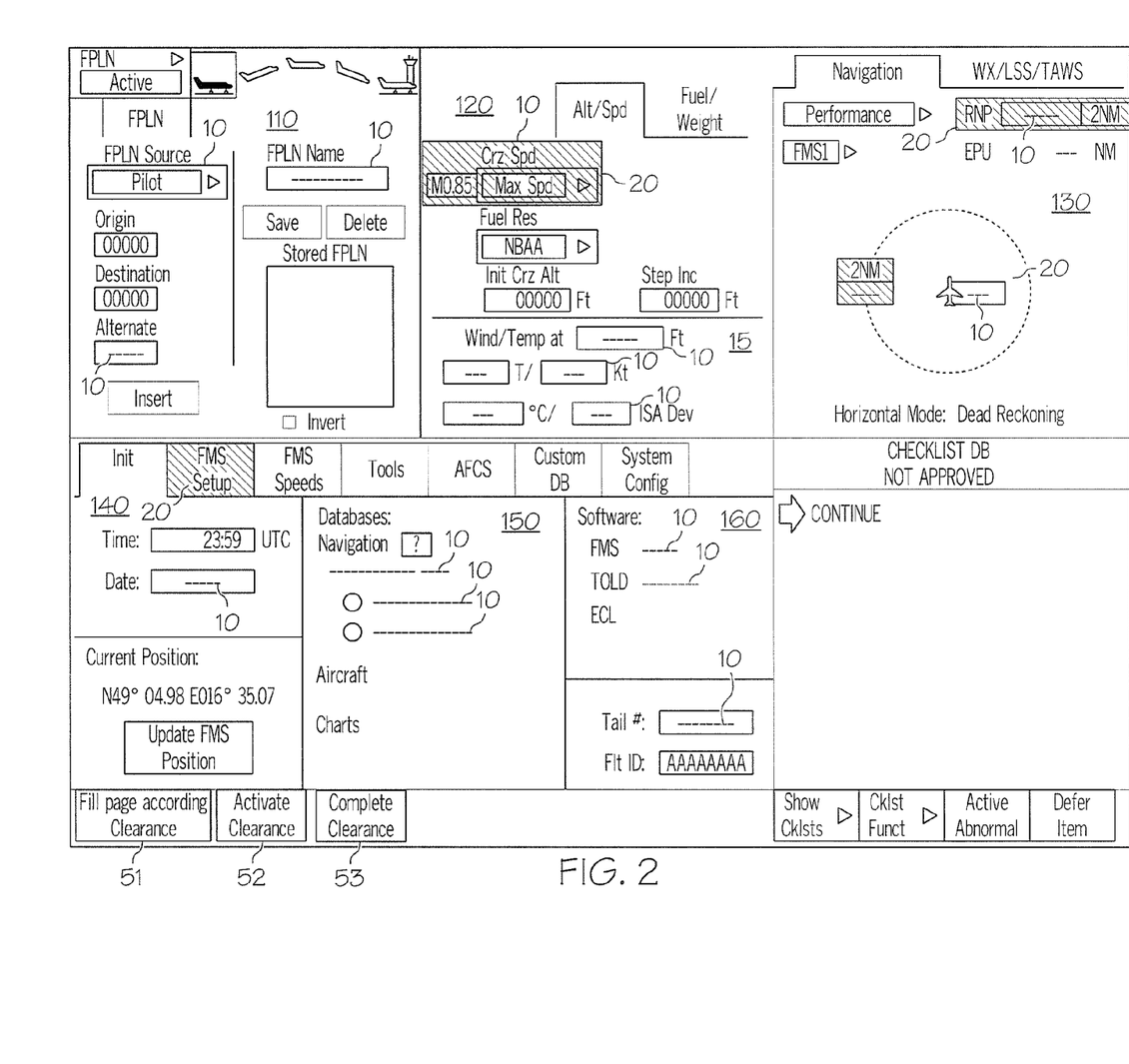
FIG. 2 is an illustration of a user interface (UI) including features of an exemplary embodiment.

FIG. 2 is an exemplary illustration of the UI 100, modified by an exemplary embodiment, which offers the pilot the option to automate the data input process for specific highlighted data input dialog boxes 20 by manipulating one or more exemplary command icons 51-53. The data input may implement an ATC clearance, for example. However, one of ordinary skill in the art, after reading the disclosure herein, will appreciate that the specific command icons 51-53 discussed herein are merely exemplary and in equivalent embodiments there may be any number of command icons or other UI modifications as may be desired that deviate from a standard mode of operation in order to address any number of specific situations. A "modification" is a conditional change to the UI and may include the addition of command icons, highlighting input and output dialog boxes and/or alpha numeric text, color changes, font changes, flashing text and the like.

For example, command icon 51 may execute a set of computer readable instructions that autofill the specific highlighted data input dialog boxes 20 of the UI 100 with information parsed from an ATC clearance message or calculated therefrom. Command Icon 52 may execute a set of computer readable instructions that activate the clearance by a flight management system (FMS) 540 as may otherwise be known in the art (see, FIG. 8). Command icon 53 may execute a set of computer readable instructions that completes the clearance. Completing the clearance may include initiating automated actions that may comprise activation of clearance within the FMS and sending a confirmation message to the sender of the ATC clearance message. Exemplary details concerning the autoparsing of a ATC clearance message, the activation of the clearance contained therein and the closing of the clearance may be found in co-owned, co-pending application Ser. No. 12/412,163 which is incorporated herein by reference in its entirety. In equivalent embodiments abstract symbology and textual information may be combined. Also, the command icons may contain information to redirect a pilot's focus to a context relevant dialog box. As non-limiting examples, such redirection text may instruct the pilot to the context relevant dialog box that says "Fill FPLN page according the Clearance" or "Review Clearance insertion on FPLN page."

Figure 3:
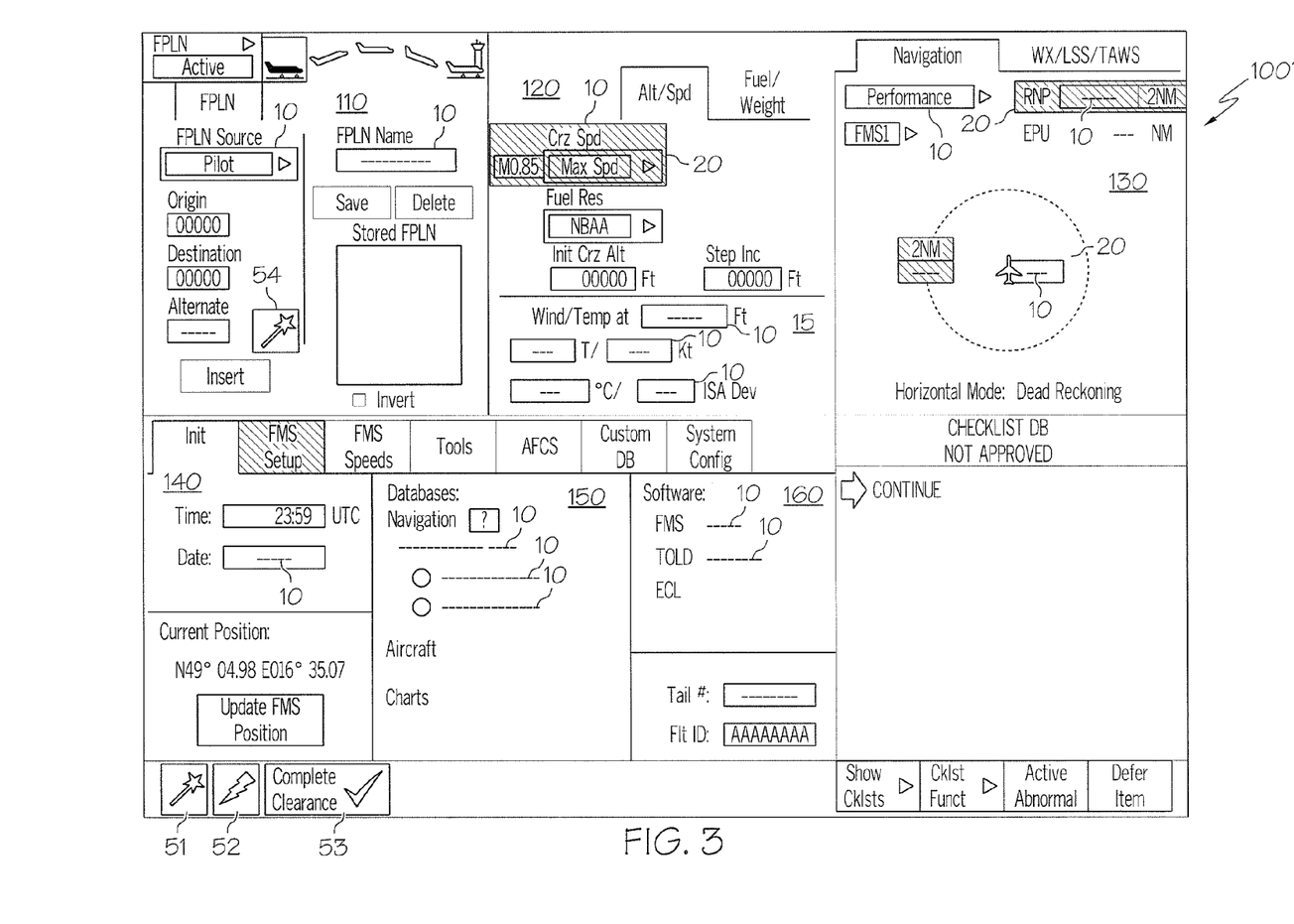
FIG. 3 is an illustration a user interface (UI) including features of an exemplary embodiment using alternative exemplary symbology.

FIG. 3 is an exemplary illustration of the UI of FIG. 2 wherein the command icons 51-53 are manifested as icons 51'-53' displaying abstract symbology instead of icons displaying alphanumeric characters, although in equivalent embodiments abstract symbology and textual information may be combined. Also, the command icons may contain information to redirect a pilot's focus to a context relevant dialog box. As non-limiting examples, such redirection text may instruct the pilot to "Fill FPLN page according the Clearance" or "Review Clearance insertion on FPLN page." FIG. 3 also may include one or more additional command icons 54 that may be rendered at certain portions of the UI 100 allowing the pilot to execute its assigned function only in that specific portion of the UI 100.

Figure 4:
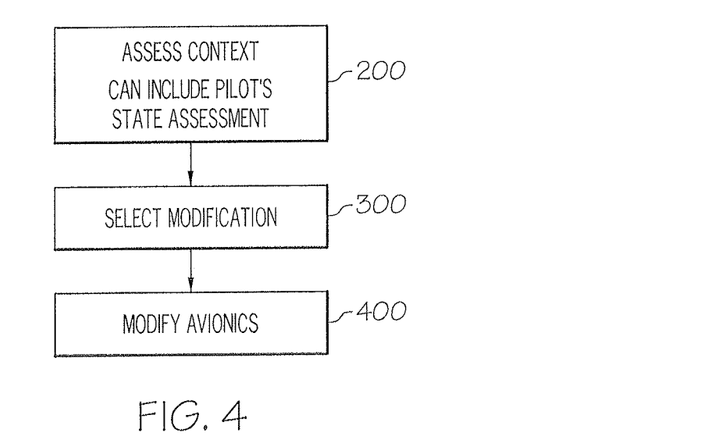
FIG. 4 is a high level flow chart of an exemplary embodiment.

FIG. 4 is an exemplary high level flow chart representative of various embodiments. In equivalent embodiments the various processes disclosed herein may be combined, processes may be separated into component sub-process and processes may be rearranged without departing form the scope of the subject matter being disclosed herein.

Figure 8A:
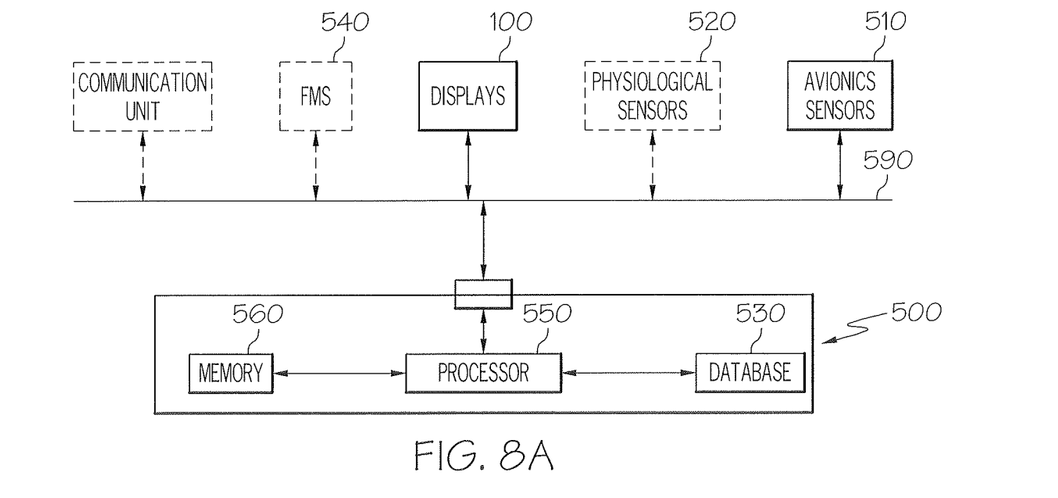
FIGS. 8A and 8B illustrate alternative exemplary system structures implementing various exemplary embodiments.
Figure 8B:
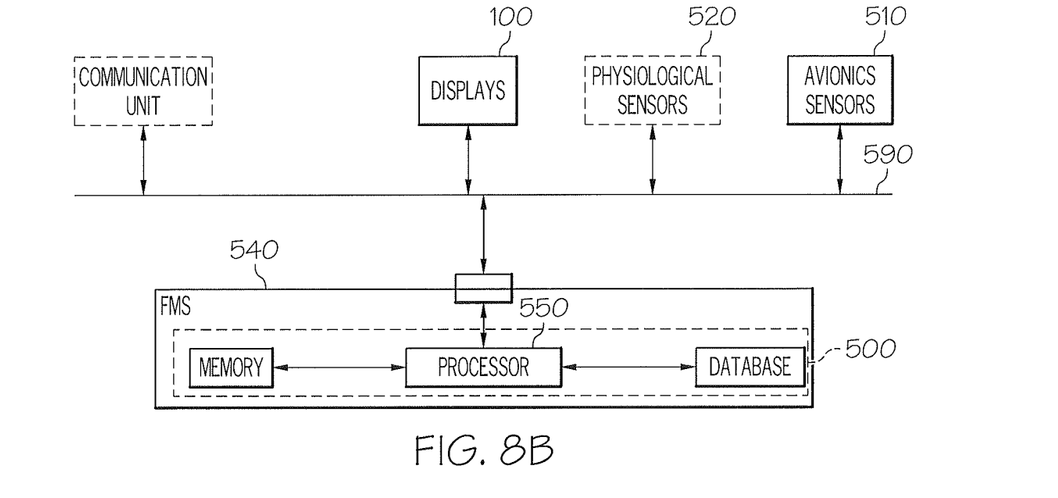

At process 200, a context of the situation of the flight and/or the pilot may be assessed by a processor 550 of system 500 (see. FIG. 8). In general, the context of the flight is measured by avionics sensors 510 and/or atmospheric sensors 515 (see, FIGS. 8A-B). The context of the pilot may be measured by physiological sensors 520. Other indicators of the flight context may include the status of other aircraft systems such as whether or not the autopilot is engaged or whether the collision avoidance system is detecting heavy traffic or is detecting a constant bearing decreasing range situation. Flight context may also be determined from non-aircraft systems such as from data received from ground based ATC systems and/or personnel.

At process 300, a predefined modification for UI 100 is selected from the database 530 by processor 550 or other computing device, based on the context of the flight determined at process 200. This is accomplished by selecting one or more predefined command icons such as "Fill Page According to Clearance," "Activate Clearance," or "Complete Clearance" and then compiling computer executable instructions associated with each command icon 51-54 to modify the UI 100. The rendering location of each of the exemplary command icons 51-54 in the UI 100 may be determined based at least upon the configuration of the current video display such that the appearance of the command icons 51-54 minimizes any effect on any information items and data input dialog boxes already being rendered in the UI 100. As a non-limiting example of minimizing any effect, the rendering of the command icons 51-54 may result in marginally moving existing symbology/text (i.e. an information item), resizing existing symbology/text or inserting new symbology/text. However, the rendering of the command icons 51-54 does not culminate in hiding, obscuring, removing, replacing or materially moving any existing symbology/text already rendered or expected to be rendered in the UI 100 from a familiar location.

Further, one skilled in that art will recognize that the modification process of the UI 100 is symmetrical. For example, should a busy flight context become calm, the flight context may cause the command icons 51-53 to be removed by the processor 550 as the result of process 300. The processor balances pilot workload by obliging the pilot to manually enter future clearances.

At process 400, the UI 100 is modified to render the command icons 51-53 and to highlight/annotate those input data dialog boxes 20 for which the input of information thereto may be automated by executing the executable instructions associated with a command icon 51. Recommended input data may also be rendered for pilot review prior to its entry into an associated input data dialog box 20.

Figure 5:
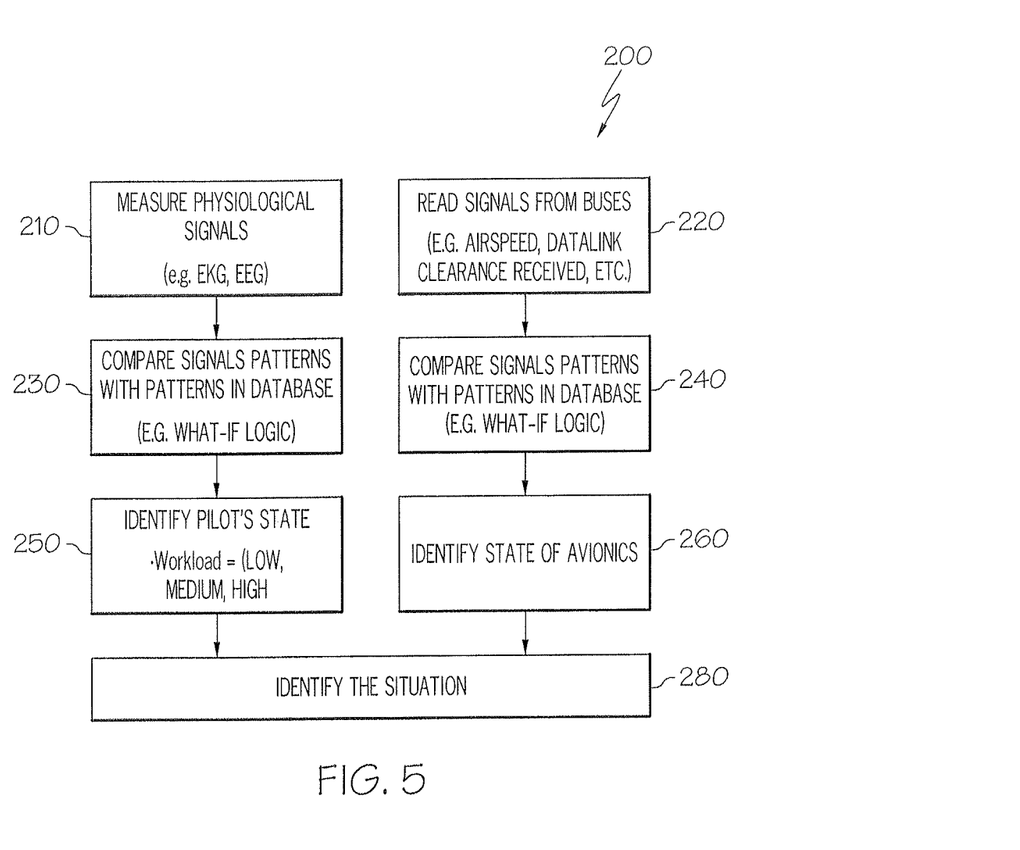
FIG. 5 is a flow chart of exemplary sub-processes comprising the context assessment process of FIG. 4.

FIG. 5 is a logic flow chart illustrating exemplary sub-processes of process 200. At sub-process 210 the state of the pilot may be determined by measuring his physiological responses. This may be accomplished using any number of known physiological sensors 520. Non-limiting examples of suitable physiological sensors may include an electrocardiogram (EKG), an electroencephalogram (EEG), blood pressure, an electrocapillary flow meter (sweat detector), a voice stress analyzer, facial expression, eye movement and the like. The physiological sensors 520 may communicate with processor 550 via a wire (e.g. via USB, Ethernet, firewire) or wirelessly utilizing any suitable wireless format known in the art (e.g. Bluetooth, Zigbee, WiFi, Wimax).

At sub-process 230, physiological data patterns received from the physiological sensors 520 may be compared to sample physiological patterns. Patterns may be stored in database 530 (See FIG. 8) and indicate a level of activity or stress level of the pilot. The sample patterns may be generic sample patterns or may personal baseline patterns taken from the pilot at an earlier time. The pilot state may then be determined at sub-process 250 based on a best fit analysis or by other known statistical matching techniques. Based on the comparison, the workload of the pilot may be categorized as light, moderate, normal or heavy, for example, or may be alternatively categorized to satisfy a particular system requirement.

At sub-process 220, the state of the aircraft may be determined by monitoring any number of avionics signals that may be generated by the various avionics sensors 510 installed within the aircraft. Non-limiting examples of suitable sensors may include wind speed/direction, atmospheric pressure, engine temperature, fire alarms, hydraulic pressure, required time of arrival (RTA) systems and collision avoidance systems.

At sub-process 240, the signals from the plurality of avionics sensors may be compared to sample avionics patterns or to a combination of discrete alarms and avionics patterns that may be stored in the database 530 (See, FIG. 8). Fires in an engine or heavy local traffic are non-limiting examples of such situations. At sub-process 260, the context of the aircraft may then be determined based on a best fit analysis or other known statistical or logical matching techniques with the sample avionics patterns. The result of the comparison may manifest itself as a discrete value or as a time series.

Based on the comparisons performed at sub-processes 250 and 260, an indication of the workload or stress level on the pilot may be determined, estimated or implied by analyzing the results from sub-processes 250 and 260. Such an analysis may be conducted using any suitable mathematical, statistical or logical algorithm known in the art or that may be developed in the future.

As a non-limiting example, the indication of workload may be determined using a simple binary comparison where a "high" indication for the pilot state and an "outside normal limits" indication of the state of the aircraft may trigger the selection of a certain modification of the UI 100 and a "low" indication for the pilot state and an "normal" indication of the state of the aircraft may not trigger a modification of the UI 100. Other exemplary analysis means may include sophisticated neural networks and artificial intelligence systems.

Figure 6:
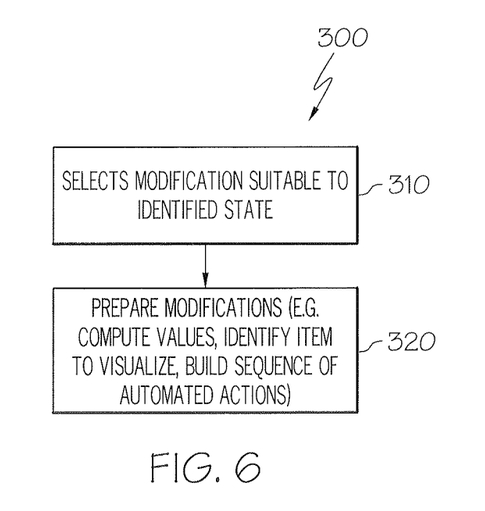
FIG. 6 is a flow chart of exemplary sub-processes comprising the modification selection process of FIG. 4.

FIG. 6 is a logic flow chart illustrating exemplary sub-processes of process 300. At sub-process 310 a modification of the UI 100 is selected by the processor 550 (see, FIG. 8) based on the workload/stress situation of the pilot determined during sub-process 280 of FIG. 2. For example, if during sub-process 280 the processor 550 detects a indication that the stress level of the pilot is low but the aircraft is experiencing adverse weather conditions that are changing rapidly, then the processor may select only a command icon 51 that automatically fills the wind and ambient temperature input boxes 15 (see, FIG. 1-3) of the cruise speed section 120 of the UI 100. Hence. the command icon 51 may contain an alphanumeric label that says "Fill Wind and Temperature."

As another example, if during sub-process 280 the processor 550 detects an indication that the stress level of the pilot is high and the aircraft is experiencing high traffic density conditions, then the processor may select command icons 51-53 that automatically fills in the applicable sections of UI 100 with information from an incoming ATC clearance message (see, FIG. 1). Hence, the command icons 51-53 may be selected and may display alphanumeric labels that says "Fill Page According to Clearance," "Activate Clearance," and "Complete Clearance." Such functions may be accomplished by any means currently known in the art or that may be developed in the future.

At sub-process 320, the parameters of modification instructions are prepared. Recommended input values are calculated and sequences of executable computer code are retrieved from the database 530, are sequenced and associated with the proper command icon 51-54 for execution. As part of the executable computer code, code may be included that renders the command icons 51-54 at particular locations that minimize any noticeable changes to the UI 100. For example, data input dialog boxes 10 and other display items may be marginally moved or reduced in size and fonts may be changed. However, information items cannot be hidden, removed, observed, replaced, or materially moved from a familiar location in order to minimize the possibility of pilot confusion when the executable computer code is executed and the UI 100 changes. Such functions may be accomplished by any computer coding means currently known in the art or that may be developed in the future. The term "removed" as used herein means "delete" and should not be construed to mean "moved," materially or otherwise.

Figure 7:
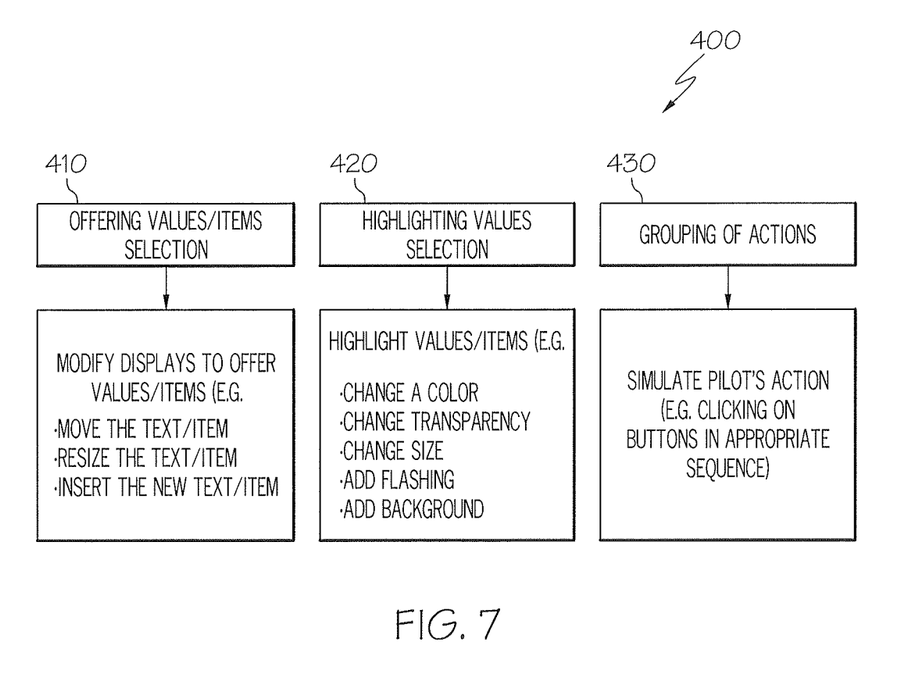
FIG. 7 is a flow chart of exemplary sub-processes comprising the avionics modification process of FIG. 4.

FIG. 7 illustrates exemplary sub-processes that may be used to execute the modification of the UI 100. Sub-process 410 executes computer readable instructions that may move an information item 10, resize an information item and/or insert the recommended input values into their associated highlighted data input dialog boxes 20 of the UI 100. Such functions may be accomplished by any computer coding means currently known in the art or that may be developed in the future.

Sub-process 420 executes the computer readable instructions. The instructions may cause a change in the color of an information item or a part thereof, change the transparency of an information item or a part thereof, change the size of an information item or a part thereof, cause an information item or part thereof to flash or to be highlighted and or add or delete background texture. Such functions may be accomplished by any computer coding means currently known in the art or that may be developed in the future.

Sub-process 430 executes the computer readable instructions. The instructions may simulate and automate a pilot's manual action sequence that would otherwise be required to accomplish the task(s) indicated by the label of the command icons 51-54.

In operation, the processor 550 may detect indications of high workload according to exemplary process 200. From the pilots' perspective, during these periods of high workload the exemplary command icons 51-53 will appear highlighted on his UI without materially changing the layout of the UI 100 being rendered. This is so the pilot is not confused by an unexpected rearrangement of the UI 100 that may otherwise occur due to the appearance of additional symbology. Further, various data input dialog boxes 20 may be highlighted or otherwise enhanced to indicate which inputs may be automated. Such enhancement may include flashing symbology/text, color differentiation, or texture differentiation. Recommended input values may also be provided by the processor 550 based at least in part on the exemplary ATC clearance message.

The pilot will know from prior training that the appearance of the command icons 51-54 offers him the option of automating some tasks that he otherwise would be obligated to accomplish manually. If the pilot desires to take advantage of the automation option, then he/she may manipulate one of the command icons such as exemplary command icon 51 labeled "Fill Page According to Clearance." In embodiments where the command icons appear on an electronic touch screen, manipulating a command icon 51-54 may comprise touching the icon. In embodiments where a conventional cockpit display unit (CDU) is used, a physical transducer or switch may be required to be manipulated.

When the pilot manipulates the exemplary command icon 51, the executable computer instructions prepared during process 300 are executed thereby modifying the UI 100. As a non-limiting example, the executable instructions may cause all of the recommended input values displayed within a highlighted data input dialog box 20 to be inputted to the FMS 540 via their respective dialog boxes. One of ordinary skill in the art will recognize that the executable instructions may be configured to undertake a plethora of tasks and that those discussed herein are merely exemplary.

FIGS. 8A and 8B are functional block diagrams of systems described herein. FIG. 8B differs form FIG. 8A in that the subject matter described here in is incorporated within an FMS 540 as a module thereof. The systems of FIGS. 8A and 8B comprise a bus 590 allowing communication between the UI 100, the physiological sensors 520, the avionics sensors 510, the FMS 540, the system 500, the FMS, the CMU and other avionic systems. The system 500 comprises a memory device 560, the processor 550 and the database 530.

Memory device 560 may be any suitable memory device known in the art and may. Non-limiting exemplary memory may include volatile memory devices, non-volatile memory devices, programmable logic devices, magnetic disks and the like. Memory device 560 is an example of a tangible computer readable medium.

The database 530 may comprise any suitable data structure known in the art and may be stored on any suitable memory device. In some embodiments, the database 530 may reside on memory device 560.

Processor 550 may be any suitable processor known in the art. Processor 550 may be a general purpose processor, a special purpose processor, a co-processor, or a virtual processor executing on a programmable logic device. Processor 550 is also an example of a tangible computer readable medium.

Figure 9:
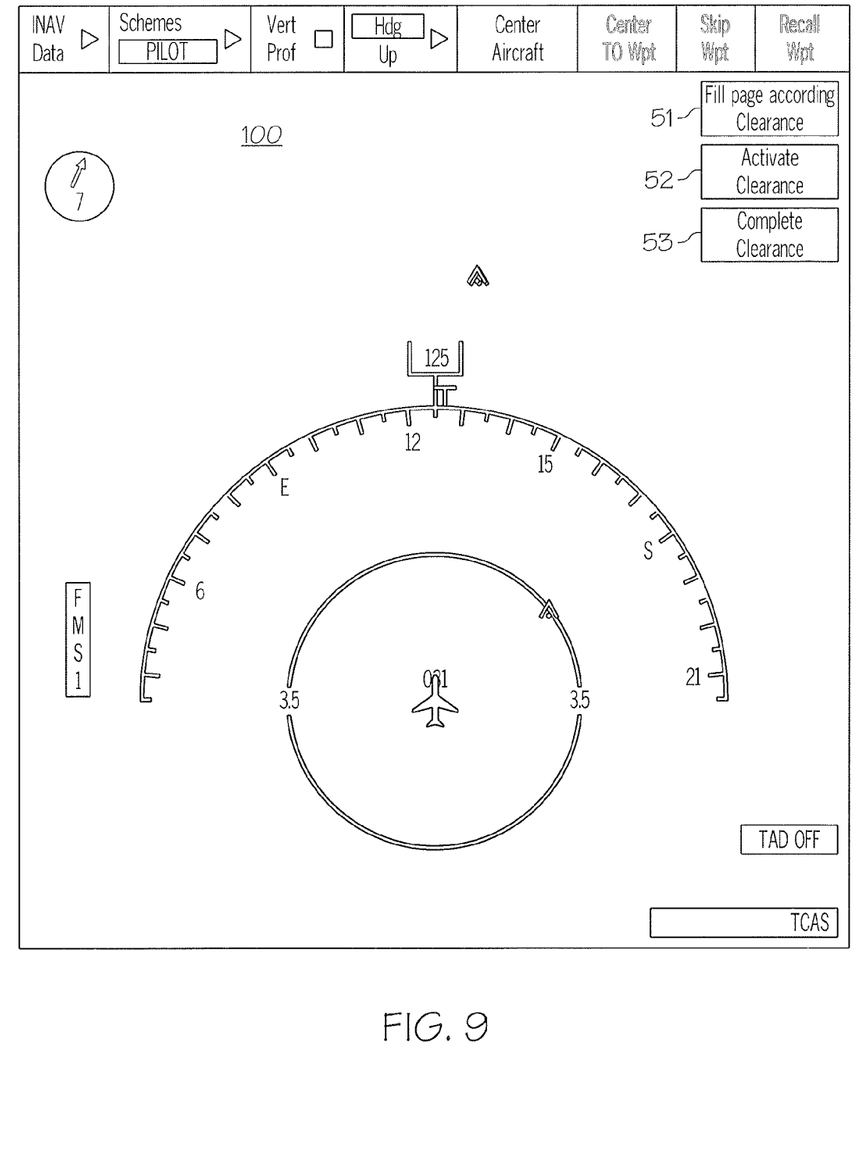
FIG. 9 is a illustration of an embodiment rendered within another exemplary UI.

FIG. 9 is a depiction of another exemplary UI 100 wherein the exemplary command icons 51-53 have been rendered according to processes 200-400. The depicted location of the command icons 51-53 is exemplary. The location of the command icons 51-53 may be located in any position within the UI so long as their appearance does not induce pilot confusion by hiding data, obscuring, removing data or replacing data. The term "removing data" as used herein should not be construed to mean "moving data" materially or otherwise.

Figure 10:
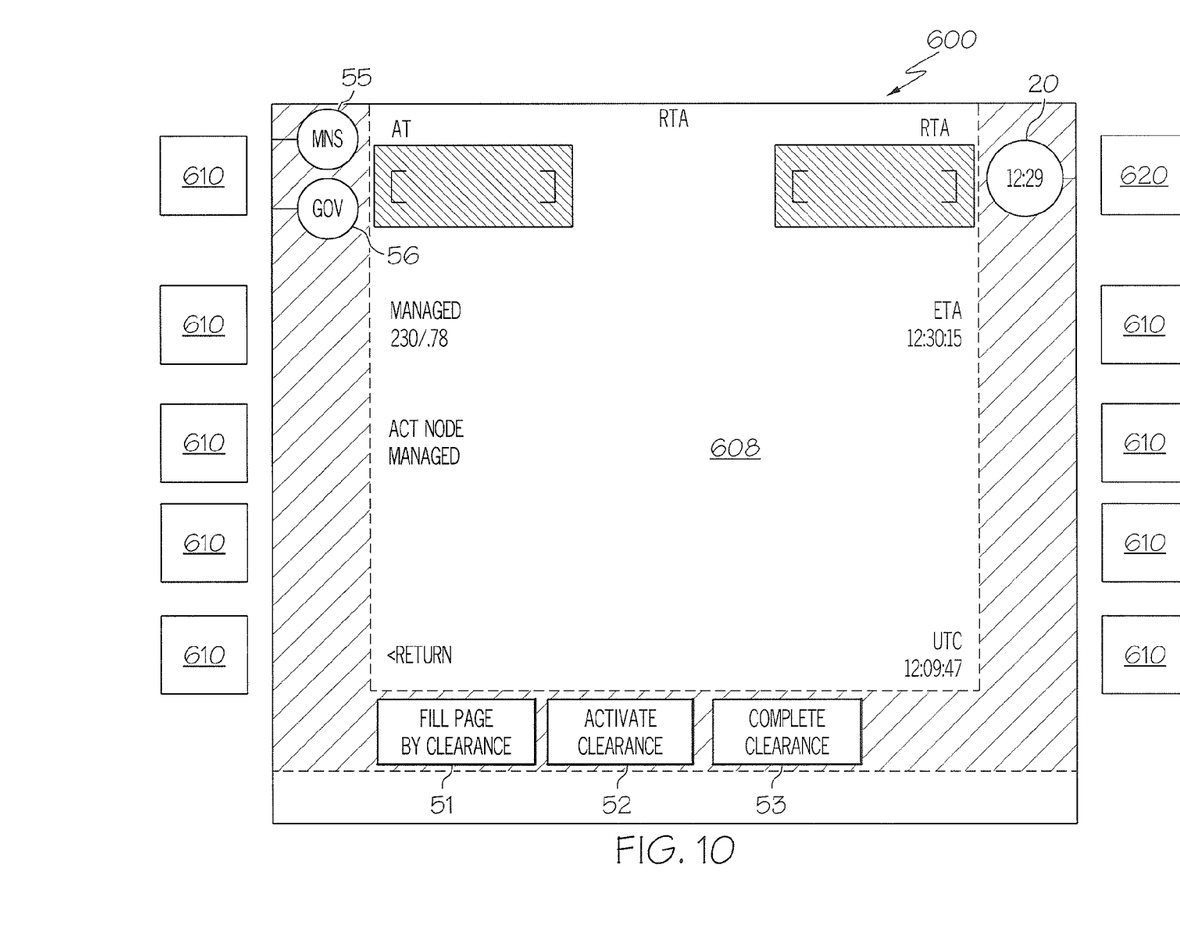
FIG. 10 is an illustration of an exemplary embodiment applied and modifying the display of a conventional cockpit display unit (CDU).

FIG. 10 is the depiction of an exemplary cockpit display unit (CDU) 600 rendering a clearance message 608 as is known in the art. The CDU 600 is rendering command icons 51-53 as disclosed in regard to FIG. 2. In addition, the CDU display is also rendering other command icons (55, 56) which may be icons suggesting to the pilot the addition of two different waypoints to the flight plan of the aircraft. The instructions associated with the command icons 51-52 and 55-56 may be executed by manipulating one or more physical transducers 610. The CDU 600 may also display proposed values for specific highlighted data input dialog boxes 20 for automated insertion into a data input dialog box 10 by manipulating transducer 620. The transducers 610-620 may be implemented by any suitable device known in the art. Non-limiting examples of such devices include physical buttons, virtual buttons, physical switches and the like.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An interactive apparatus for an aircraft, comprising:
a display device displaying a user interface (UI), and
a processor in operable communication with the display device, the processor configured to:
 determine a state of the aircraft,
 prepare a modification to the displayed UI based in part on the state of the aircraft such that the modification adds one or more command icons to a space on the displayed UI that is unoccupied by a command icon, and doing so without obscuring, without removing, and without replacing any information item on the display, and
 supply commands to the display device to thereby execute the modification to the displayed UI.

2. The interactive apparatus of claim 1, wherein the processor is configured to determine a state of a pilot.

3. The interactive apparatus of claim 2, wherein the modification is prepared based in part on the state of the pilot.

4. The interactive apparatus of claim 3, an indication of the state of the pilot is received as a signal from a physiological sensor.

5. The interactive apparatus of claim 4, wherein the processor is further configured to compare the signal received from the physiological sensor with one or more physiological signal patterns stored in a database.

6. The interactive apparatus of claim 1, wherein an indication of a state of the aircraft is received as a signal from an avionics sensor.

7. The interactive apparatus of claim 6, wherein the processor is further configured to determine the state of the aircraft by comparing the signal received from the avionics sensor with one or more stored avionics signal patterns.

8. The interactive apparatus of claim 7, wherein compiling preparation of the modification comprises:
 choosing a pre-defined command icon based at least in part on the state of a pilot and the state of the aircraft;
 computing one or more values associated with the chosen pre-defined command icon;
 modifying the UI to display the chosen pre-defined command icon and
 selecting and sequencing one or more executable computer instructions that when executed by manipulating the chosen pre-defined command icon cause the UI to automate a series of manual pilot actions associated with the chosen pre-defined command icon.

9. A method for selectively balancing the workload of a pilot, comprising:
 acquiring data in a processor;
 determining, in the processor, a state of an aircraft from the data;
 preparing a set of computer executable instructions, in the processor, by selecting a pre-determined modification to a user interface (UI) that is based at least in part on the state of the aircraft; and
 providing the pilot with an option to execute the set of computer executable instructions by rendering a command icon on the UI, wherein the rendering adds one or more command icons to a space on the displayed UI that is unoccupied by a command icon, and doing so without hiding, without removing, and without replacing any information item within the UI.

10. The method of claim 9, further comprising determining a physiological state of the pilot from the data.

11. The method of claim 9, wherein the data comprises physiological data and avionics data.

12. The method of claim 11, wherein preparing the set of computer executable instructions is based on the avionics data.

13. The method of claim 12, wherein the set of computer executable instructions highlights a specific plurality of data input dialog boxes.

14. The method of claim 13, wherein the set of computer executable instructions displays suggested data appropriate to each data input dialog box of the plurality proximate to each data input dialog box of the plurality.

15. The method of claim 14, wherein the set of computer executable instructions inputs the suggested data into its proximate data input dialog box upon the pilot manipulating the command icon.

16. A tangible computer readable storage medium containing computer executable instructions that when executed perform tasks including:
 acquiring data;
 determining a state of the aircraft from the data;
 preparing a set of computer executable instructions by selecting a pre-determined modification to a user interface (UI) that is based at least in part on the state of the aircraft; and
 providing a pilot with an option to execute the computer executable instructions by rendering a command icon to the UI, wherein the rendering adds one or more command icons to a space on the displayed UI that is unoccupied by a command icon, and doing so without hiding, without removing, and without replacing any information item within the UI.

17. The tangible computer readable storage medium of claim 16, further comprising determining a physiological state of the pilot from the data.

18. The tangible computer readable storage medium of claim 17, wherein the data comprises physiological data and avionics data.

19. The tangible computer readable storage medium of claim 18, wherein compiling the set of computer executable instructions is based on the avionics data.

20. The tangible computer readable storage medium of claim 19, wherein the set of computer executable instructions highlights specific plurality of data input dialog boxes.

* * * * *